United States Patent [19]
Watanabe

[11] 3,716,669
[45] Feb. 13, 1973

[54] MAPPING RECTIFIER FOR GENERATING POLARSTEREOGRAPHIC MAPS FROM SATELLITE SCAN SIGNALS

[75] Inventor: Kantaro Watanabe, Tokyo, Japan

[73] Assignee: Research Corporation, New York, N.Y.

[22] Filed: May 14, 1971

[21] Appl. No.: 143,454

[52] U.S. Cl.....................178/6.7 A, 178/6.8, 343/17, 355/52

[51] Int. Cl..........G01s 7/06, G03b 27/68, H04n 1/24

[58] Field of Search..........178/6.5, 6.8, 6.7 R; 343/5, 343/5 PC, 17; 355/52

[56] References Cited

UNITED STATES PATENTS

| | | | |
|---|---|---|---|
| 3,026,765 | 3/1962 | Guarricini | 355/52 |
| 3,319,105 | 5/1967 | Koda | 343/17 |
| 3,015,988 | 1/1962 | Hemstreet | 355/52 |
| 3,401,595 | 9/1968 | Dinhobel | 355/52 |

*Primary Examiner*—Howard W. Britton
*Attorney*—Robert S. Dunham, P. E. Henninge, Lester W. Clark, Gerald W. Griffin, Howard J. Churchill, R. Bradlee Boal, Christopher C. Dunham, Robert Scobey, Henry T. Burke and Ivan S. Kavrukov

[57] ABSTRACT

Disclosed is a system including electrical, mechanical and optical components and serving to generate polarstereographic maps of the Earth surface from scan signals sent by meteorological satellites such as Nimbus. The satellite scan signals are received by suitable radio equipment and are used to generate scan line images on a cathode ray tube having a concave face matching the Earth's curvature to compensate for the face that the satellite scans a spherical surface. The cathode ray tube is positioned along a circular track such that a scan line image on the CRT concave face is congruent with a sphere concentric with the track. Two diametrically opposite points of the sphere are designated South and North pole respectively, and a photocamera is positioned near the track such that the front nodal point of its lens is at either the South or the North pole of the sphere. The purpose of the circular track system is to compensate for the orbital motion of the satellite around the Earth and to project on planar film in the camera a polarstereographic projection of the scanned Earth surface. To that end, the cathode ray tube and the camera are moved with respect to each other along the circular track in synchronism with the orbital motion of the satellite around the Earth while the camera remains with the front nodal point of its lens at the South (or North) pole point of the track. The camera has a zoom control which keeps the front nodal point of the camera lens at the South (or North) Pole as the cathode ray tube and the camera move with respect to each other. A compensation is made for the east-west rotation of the Earth by means of rotating the camera around the North-South axis of the track. A further compensation is made for inclination of the satellite orbit from the Earth axis by means of adjusting the orientation of the camera with respect to the track plane. Lee than a 360° track may be used if a map of only a portion of the scanned Earth surface is desired.

18 Claims, 9 Drawing Figures

INVENTOR
KANTARO WATANABE
BY
Ivan S. Kavrukov
ATTORNEY

INVENTOR
KANTARO WATANABE
BY
Ivan S. Kavrukov
ATTORNEY

MAPPING RECTIFIER FOR GENERATING POLARSTEREOGRAPHIC MAPS FROM SATELLITE SCAN SIGNALS

BACKGROUND OF THE INVENTION

Some artificial satellites, as for example, the meteorological satellite Nimbus, scan the Earth's surface at ground, sea and cloud levels nearly perpendicularly to the orbital plane of the satellite to measure parameters such as radiation emitted by the Earth's surface, solar radiation reflected by the Earth's surface, etc., and transmit the scan signals in sequence to ground stations by radio. For example, the Nimbus I satellite is equipped with: an automatic picture transmission system enabling ground stations with relatively simple equipment to obtain radio-transmitted cloud cover pictures; a Vidicon camera system which acquires and transmits TV pictures; and an infrared radiometer system which measures and transmits back to Earth stations Earth emitted radiation in the 3.6 to 4.2 micron range.

The satellite scan signals differ from standard projection maps and are distorted because of factors such as the spherical surface of the Earth and the time-varying relative position of the Earth and the satellite. It is necessary therefore to rectify such distortions, and to convert the rectified image into a standard map projection so that the information from the satellite can be conventionally used for scientific purposes.

Rectification of satellite-transmitted data and generation of standard map projections has been heretofore performed by digital computer systems, such as the computer system of the United States National Environmental Satellite Services (NESS). Satellite scan signals relayed to NESS are supplied to the computer system together with information about satellite orbit parameters. Several times each day the scan information supplied by the satellite is used to generate standard map projections by means of operating the computer system under specially designed software packages. Rectified scan images are combined into a single montage and displayed on a cathode ray tube for photocopying. Scan data of the polar regions and the middle latitudes is commonly displayed in the form of polarstereographic projection maps, while the tropical zone is commonly projected on a Mercator map.

Whether the digital computer system used for generated rectified map projections is operated in real time or in batch mode, the expense of carrying out the complex calculations by computer means is considerable. It is desirable, therefore, to provide a simpler special purpose device to generate a standard map projection of satellite scan signals of quality comparable or better than that of the maps generated by the commonly used digital computer systems, but at lower expense.

Attempts have been made in the past to use systems including electrical, mechanical and optical components to rectify aerial photographs to remove distortions and to generate certain specific map projections. For example, Guarricini et al., U.S. Pat. No. 3,026,765 show an electro-optical system for rectifying photographs taken by an Earth satellite camera to convert oblique Earth photographs to orthogonal map representations in the form of gnomonic projections complete with lines of latitude and longitude. The system compensates for distortion due to oblique viewing of the Earth and modifies each picture to fit a common map coordinate system by projecting photographs on a convex translucent screen matching the Earth curvature, and projecting on the same screen a grid of latitude and longitude lines. The complete projection on the screen is then photographed on planar film to obtain a gnomonic projection. The device for projecting the original satellite photographs on the convex screen and the device for projecting on the screen the grid of latitude and longitude lines are oriented by a complex mechanical servo system to compensate for certain aspects of the changing relative positions of the satellite camera and the Earth. Other examples of servo systems for compensating for certain distortions in aerial photograph are: Dinhobel et al., U.S. Pat. No. 3,401,595, Magill, U.S. Pat. No. 3,409,362 and Reiner et al., U.S. Pat. No. 2,839,974.

SUMMARY OF THE INVENTION

The invention relates to generating polar-stereographic projection maps of a spherical body, such as the Earth, from scan signals generated by and transmitted from an artificial satellite thereof, such as the meteorological satellite Nimbus. A composite polarstereographic map projection is generated which compensates for the spherical surface of the Earth, for the motion of the satellite around the Earth, for the rotation of the Earth with respect to the satellite orbital plane, and for inclination between the Earth's axis of rotation and the satellite orbital plane.

The polarstereographic map projections are generated by apparatus including a curved screen, such as a special CRT face, which is congruent with at least an arc from the surface of an imaginary sphere proportional in size to the Earth. The scan signals transmitted from the satellite generate on the curved screen a screen image comprising a scan arc corresponding at any given time to one of the scan lines traced during successive scans of the Earth's surface (at a specified level) by the satellite. A map screen is positioned outside the imaginary sphere and substantially perpendicularly to an axis of the imaginary sphere corresponding to the North-South axis of the Earth, and a lens having a front nodal point on the North or South pole of the imaginary sphere is used to project the curved screen image onto the map screen.

In order to produce on the map screen a composite polarstereographic projection of the screen image, so as to generate a polarstereographic projection of the scanned Earth, a compensation is made for the orbital motion of the satellite by moving the curved screen and the map screen with respect to each other in synchronism with the satellite orbital motion while retaining the congruence of the curved screen and the imaginary sphere and while retaining the angle of the map screen with respect to the imaginary sphere axis.

The lens may be under zoom control assuring that its front nodal points remain at the same point on the imaginary sphere, and under tilting angle control.

Another compensation is made for rotation of the Earth with respect to the satellite orbital plane by rotating the map screen around the North-South axis of the imaginary sphere in synchronism with the rotation of the Earth with respect to the satellite orbital plane.

Still another compensation is made for possible inclination between the satellite orbital plane and the Earth's axis by means of positioning the map screen at an angle from the imaginary sphere axis which is off a 90° angle by an amount proportional to the inclination of the Earth's axis and the satellite orbital plane.

DETAILED DESCRIPTION

Figures 1, 2, 3, 4:
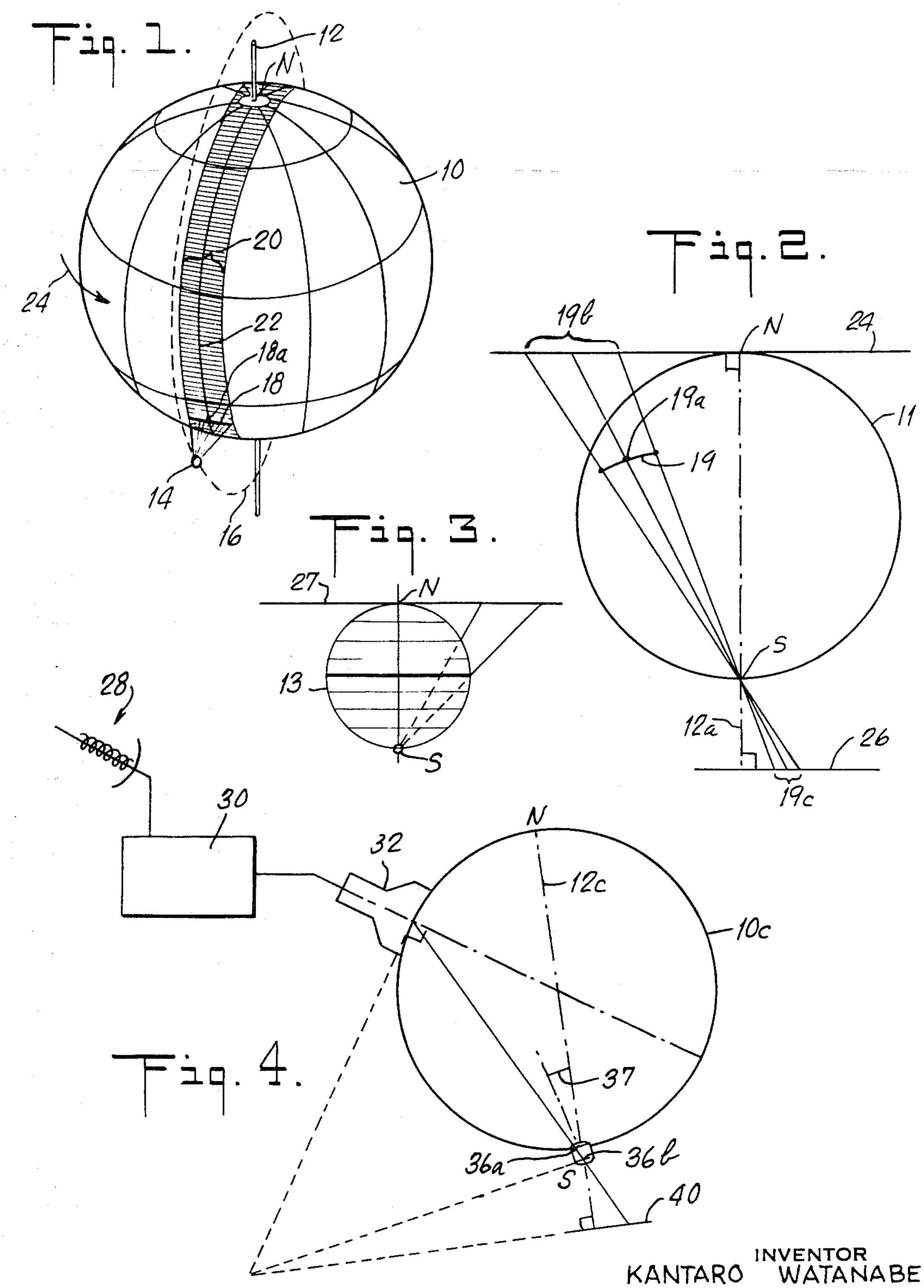
FIG. 1 is a schematic representation of a spherical body, such as the Earth, and of an artificial satellite scanning a band of the spherical body in scan lines transverse to the satellite orbital plane.
FIG. 2 is a schematic representation of the spherical body of FIG. 1 as viewed from an infinitely distant point on the equatorial plane, and shows a scan line and its polarstereographic projection.
FIG. 3 is an illustration of the nature of a polarstereographic map projection.
FIG. 4 is a schematic representation of apparatus for generating polarstereographic map projections.

The purpose of the apparatus described herein is to generate a composite polarstereographic map projection of the surface of a spherical body, such as the Earth, from signals relayed by an artificial satellite thereof scanning the surface of the spherical body in scan lines transverse to the satellite orbital plane. To generate the desired polarstereographic map projection, the apparatus must compensate for the fact that the scanned body has a spherical surface, for the motion of the satellite around the scanned spherical body, for rotation of the scanned spherical body with respect to the satellite orbital plane, and for possible inclination between the axis of rotation of the scanned spherical body and the satellite orbital plane.

For the purpose of indicating the general environment of the apparatus described in detail below, reference is made to FIG. 1 which shows a spherical body 10 having an axis of rotation 12 and an artificial satellite 14 traveling around the spherical body 10 in an orbit 16. The spherical body 10 may be the Earth, and reference is made in the description below to the Earth and to Earth parameters such as Equator, North and South poles, etc., but it should be clear that the invention is applicable to scan signals relayed from artificial satellites scanning other spherical bodies, such as, for example, other planets.

The satellite 14, which for example may be the meteorlogical satellite Nimbus, scans the Earth surface along short scan lines 18 which are nearly perpendicular to the orbital plane of the satellite 14. The plurality of scan lines 18 for a single orbit of the satellite 14 around the Earth form a band 20 intersected by the orbital plane of the satellite 14 at circle 22. It is noted that the scan lines 18 are in fact arcs which are tangent to lines perpendicular to the satellite orbital plane and passing through the circle 22. It is also noted that the scan lines 18 may be at sea level, or at a defined different level, such as at cloud level.

The satellite orbital plane may be somewhat offset from the polar axis 12 of the Earth; as seen in FIG. 1, the North Pole N is not in the plane defined by the circle 22, but is somewhat offset therefrom. As the satellite 14 orbits the Earth in its orbit 16, the Earth rotates eastwardly around its polar axis 12 as indicated by the arrow 24.

If the Earth is viewed from an infinitely distant point on the Equatorial plane, the Earth appears as the circle 11 of FIG. 2, and a projection of a scan line 18 appears as an arc 19. The midpount 19*a* of the arc 19 represents a point 18*a* directly below the satellite 14. A geometric transfer of the arc 19 to a plane tangent to the Earth projection 11 at the North Pole N from a point on the circle 11 opposite the point of tangency, i.e., from the South Pole S of the Earth projection 11 results in a polarstereographic projection 19*b* of the line 19 on the tangent plane 24.

The nature of polarstereographic map projections is illustrated more clearly in FIG. 3 where a schematic representation of the Earth is designated 13 and a plane 27 is tangent to the Earth 13 at the North Pole N thereof. A polarstereographic map projection of the northern hemisphere results from geometrically projecting the northern hemisphere of the Earth 13 onto the plane 27 from a point at the South Pole S. The Equator and the parallels appear as concentric circles on the plane 24. while the meridians appear as radial lines emanating from the common center of the circles. Similarly, a polarstereographic projection of the southern hemisphere results from projecting the southern hemisphere onto a plane (not shown) tangent to the Earth at the South Pole S thereof from a point at the North Pole N.

Referring back to FIG. 2, it is seen that if a plane 26 is placed below the South Pole S and perpendicularly to the North-South axis 12*a* of the Earth projection 11, and if the arc 19 is projected on the plane 26 by means of a lens having its front nodal point at the South Pole, the projection 19*c* on the plane 26 is proportional to the projection 19*a* on the plane 24 and is a polarstereographic map projection of the arc 19. Still in reference to FIG. 2, if the circle 11 represents the cross section of an imaginary sphere proportional to the Earth and the arc 19 is a proportional representation on the sphere of the scan line 18 of the Earth surface, and if the arc 19 on the sphere is projected onto the plane 26, the projection 19a on the plane 24 and the projection 19*b* on the plane 26 are each polarstereographic projection maps of the actual scan line 18 of the Earth surface.

For a brief schematic illustration of apparatus for obtaining polarstereographic map projections on the principle disclosed in connection with FIGS. 2 and 3, reference is made to FIG. 4. In FIG. 4, an antenna 28 receives radio signals relayed by an artificial satellite such as Nimbus. The antenna 28 may be of conventional design, as for example a single eight turn helix antenna with manual or automatic remote control for azimuth and elevation. In a particular example, the antenna may have a gain of 12 db and beam width of about 38° with a bandwidth of several megacycles.

The signals from the antenna 28 are amplified by an amplifying system 30 which may include a preamplifier physically mounted on the antenna 28 and having narrow band width and a noise figure of about 4 db. The amplifying system 30 may include a conventional receiver having a sensitivity of −96 dbm (6 microvolts) or better, a predetection band width of at least 30 kc/s and a noise figure of less than 8 db.

The output of the amplifying system 30 is the input of a specially designed cathode ray tube 32 which has a curved screen 34. The curvature of the screen 34 is such that the screen 34 is congruent with a portion of an imaginary sphere of which the circle 10*c* is a cross-section.

The scan line data transmitted from the artificial satellite 14 is used to project on the curved screen 34 representation of scan line data relayed by the artificial satellite 14 and received by the antenna 28 and amplified by the amplifying system 30. It should be clear that if a representation on the curved screen 34 is projected on a map screen 40 positioned outside the circle perpendicularly to a north south axis 12*c* of the circle 10*c* through a lens 36 positioned at the South Pole S, the projection on the map screen 40 is a polar-stereographic map projection of the image on the curved screen 34. Thus, an arc 38 in the plane of FIG. 4, projected through the lens 36, appears as a line 38*a* on the map screen 40. The line 38*a* is a polarstereographic map projection of the arc 38. The lens 36 must have its front nodal point 36*a* on the imaginary sphere defined by its cross-section 10*c*; additionally, the plane of the lens 36 passing through its rear nodal point 36*b* must coincide with the intersecting line of the plane of the map screen 40 and a plane which is tangent to the curved screen 34 at the central point 44 thereof. The relative position of the lens 36 defines a tilted angle 37 which is the angle between the line 12c and a line from the center 44 of the curved screen 34 to the front nodal point 36*a* of the lens 36.

It is noted that the representations on the curved screen 34 of scan lines 18 are not in the plane of FIG. 4 but are perpendicular to the plane of FIG. 4 (actually tangent to lines perpendicular to the plane of FIG. 4). Thus, a representation on the curved screen 34 of a scan line 18 is an arc 42 which is tangent to a line perpendicular to the plane of FIG. 4 and passing through point 44.

If only one arc 42 is shown on the curved screen 34 at any particular time, each successive arc 42 represents scan lines 18 which are removed from the North Pole N of the Earth by incrementally different distances because of the rotation of the satellite 14 around the Earth. To compensate for this rotation, the curved screen 34 may be moved along the circle 10*c* of FIG. 4 in synchronism with the rotation of the satellite 14 around the Earth 10. Alternately, the map screen 40 may be moved along the circle 10*c*, while retaining its relative relationship to a diameter of the circle 10*c*, in synchronism with the orbital motion of the satellite 14 around the Earth 10. Still alternately, both the curved screen 34 and the map screen 40 may be moved to simulate the relative motion between the Earth 10 and the satellite 14 due to the orbital motion of the satellite.

Figure 5:
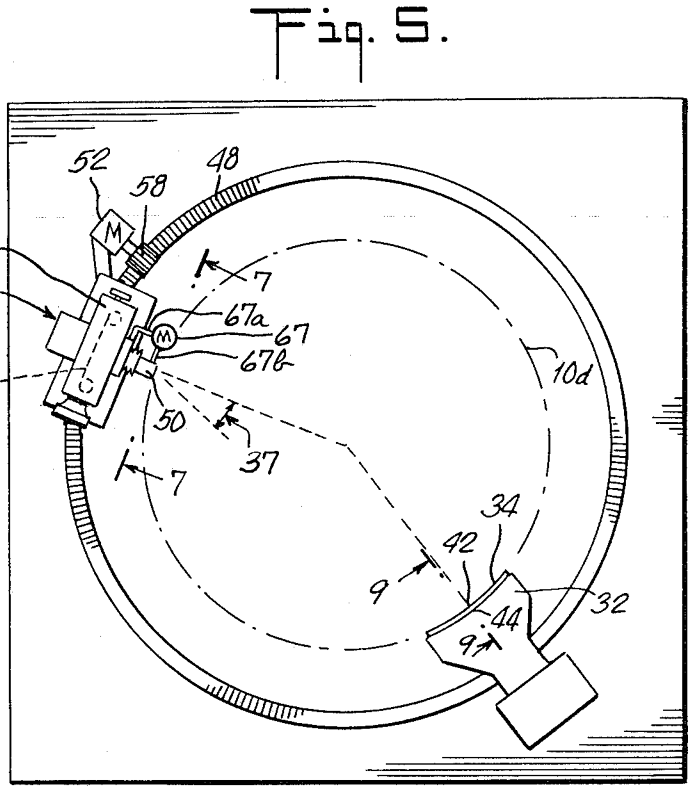
FIG. 5 is a more detailed plan view of the apparatus of FIG. 4 for obtaining polarstereographic map projections, and shows a cathode ray tube with a concave screen and a camera riding along a circular track.

Apparatus for carrying out such relative motion between a curved screen 34 and a map screen 40 is illustrated in FIG. 5 which shows a cathode ray tube 32 and a camera 46 (containing planar film serving as map screen 40) positioned along a circular track 48. The curved screen 34 is congruent with an imaginary sphere whose cross-section is the circle 10*d* of FIG. 5, and the camera 46 has a lens system 50 whose front nodal point is at the circle 10*d* and whose tilting angle 37 is as defined in connection with FIG. 4. The film in the camera 46 is in a plane perpendicular to a diameter of the imaginery sphere represented by the circle 10*d* and this serves as a map screen 40.

As discussed in connection with FIG. 4, when the scan line data from the artificial satellite 14 is used to represent on the curved screen 34 and arc 42 (see FIG. 9) tangent to a line perpendicular to the plane of FIG. 5 at point 44 on the circle 10*d*, a polarstereographic map projection of the image of 34 is caused to appear on the film in the camera 46.

When the satellite 14 is above a point nearest the north pole, the cathode ray tube 32 and the camera 46 are diametrically opposite each other along the track 48. For the next scan line represented on the curved screen 34, relative motion between the camera 46 and the CRT 32 to simulate the orbital motion between the satellite 14 and the Earth 10 is caused by moving the camera 46 along the circular track 48 over a distance corresponding to the distance between two successive scan lines 18. The motion of the camera 46 is carried out by a motor 52 (FIGS. 5, 7 and 8) operated in synchronism with the same signals from the satellite 14 which are used to index conventional facsimile recording equipment.

Figures 7, 8, 9:
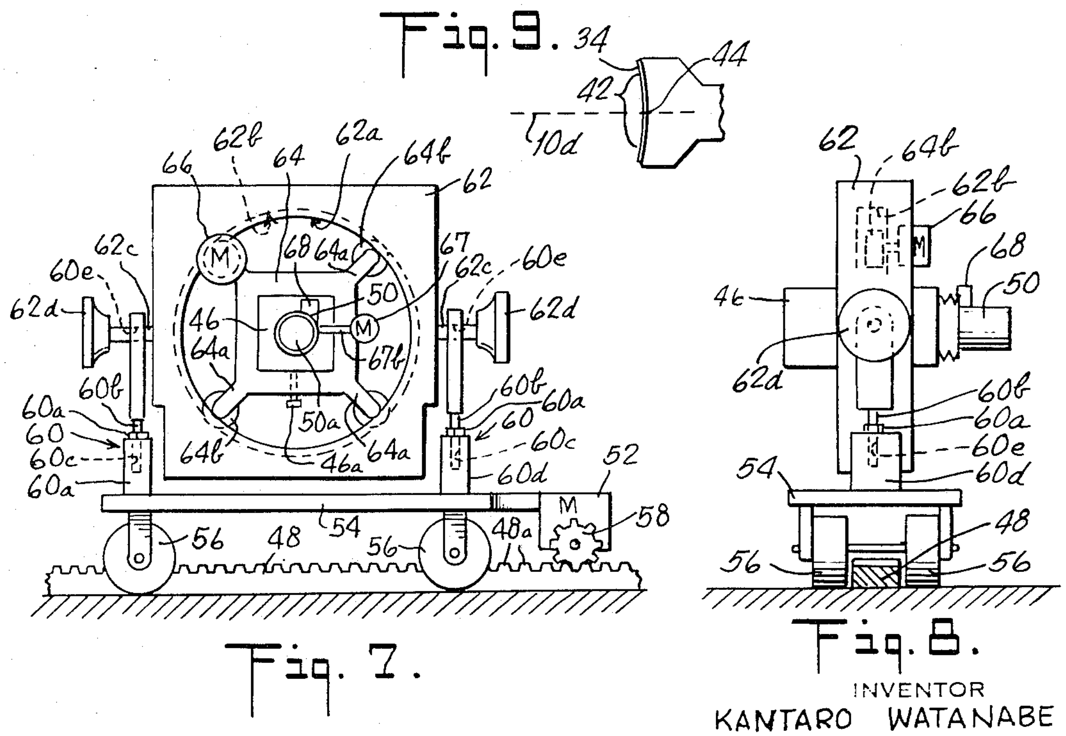
FIG. 7 is a sectional view taken along line 7—7 of FIG. 5 showing a front elevation of the camera and of a portion of the circular track.
FIG. 8 is a side elevational view of the camera of FIG. 7.
FIG. 9 is a partial sectional view of the cathode ray tube taken along line 9—9 of FIG. 5.

As shown in greater detail in FIGS. 7 and 8, the motor 52 is rigidly attached to a horizontal platform 54 supported on two coaxial pairs of casters 56 engaging the track 48 to travel therealong. The motor 52 drives a gear wheel 58 which engages teeth 48*a* on the top surface of the track 48 to move the platform 54 along the track 48.

The horizontal platform 54 supports, by means of two vertical arms 60, a housing 62 which has a centrally positioned cylindrical opening 62*a*. The camera 46 is held within the cylindrical opening 62*a* by means of a rectangular frame 64 which encircles the camera 46 and which has four radial extensions 64*a* each terminating in a caster 64*b* riding in a groove 62*b* within the cylindrical opening 62*a* of the housing 62.

At any particular time, the curved screen 34 shows only one arc 42 corresponding to only one scan line 18. To compensate for the fact that the next scan line 18 of the satellite 14 is incrementally moved with respect to the North Pole N of the Earth 10, the camera 46 is moved by a corresponding incremental distance along the track 48 by means of indexing the motor 52 before the next arc 42 appears on the curved screen 34.

If the film inside the camera 46 (which film corresponds to the map screen 40 of FIG. 4) is held stationary with respect to its plane, the image projected thereon would be distorted because of the east-west rotation of the Earth 10 with respect to the orbital plane of the satellite 14. To compensate for such distortion, the film inside the camera 46 must be rotated in its plane around an axis congruent with a diameter of the imaginary sphere represented by the circle 10*d* of FIG.

5. Such rotation must be synchronized with the eastwardly rotation of the Earth 10 with respect to the orbital plane of the satellite 14 such that a full revolution of the film around its axis of rotation corresponds to a full revolution of the Earth with respect to the satellite orbital plane.

Figure 6:
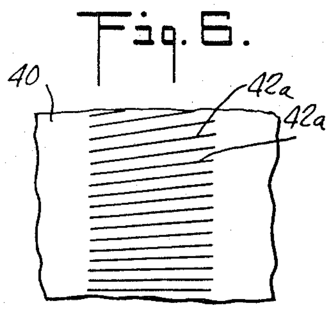
FIG. 6 is a schematic representation of scan lines recorded on film in the camera of FIG. 5.

In reference to FIGS. 7 and 8, the means for compensating for the eastwardly rotation of the Earth 10 with respect to the orbital plane of the satellite 14 includes a motor 66 driving one of the casters 64*a* of the rectangular frame 64 which holds the camera 46. The motor 66 drives the caster 64*a* to which it is connected at such speed so as to cause one full 360° rotation of the frame 64 for each 360° rotation of the Earth 10 with respect to the orbital plane of the satellite 14. As a result of rotating the camera 46 by the motor 66, adjacent scan line representations 42*a* on the film 40 inside the camera 46 are not parallel to each other as adjacent scan lines 18 are substantially parallel to each other, but are at an angle to each other as shown in an exaggerated fashion in FIG. 6.

If the center 50*a* of the camera lens 50 and the center 44 of an arc on the curved screen 34 are in the same plane on the circle 10*d*, additional distortion in the polarstereographpic map projection on the film 40 inside the camera 46 would be introduced if there is an angle between the orbital plane of the satellite 14 and the polar axis 12 of the Earth 10. This distortion can be corrected by placing the film 40 inside the camera 46 perpendicularly not to a diameter in the plane of the circle 10*d* of FIG. 5, but in a plane of diameter of the imaginary sphere which diameter is at the same angle to the plane of the circle 10d as the angle between the satellite orbital plane and the Earth polar axis.

For the purpose of adjusting the angle of the film 40 inside the camera 46 with respect to the plane of the circle 10*d* of FIG. 5, provisions are made for changing the height of the camera 46 with respect to the platform 54 and for tilting the camera 46 such that it points to the center of the circle 10*d*. The camera 46 may be moved in a plane coinciding with the film 40 inside the camera (i.e., in the plane of the map screen 40) if the angle between the orbital plane of the satellite and the Earth's axis of rotation is small, or the camera may be moved along an arc of the imaginary sphere defined by the circle 10*d* of FIG. 5 if the angle between the satellite orbital plane and the Earth's axis of rotation is large.

For the purpose of changing the height of the camera 46 with respect to the platform 54, the length of the upright arms 60 which support the housing 62 can be changed by means of manually turning nuts 60*a* which are threaded onto shaft 60*a* slidably fitted into vertical bores 60*c* into the lower portions 60*d* of the upright arms 60.

For the purposes of pointing the camera 46 toward the center of the circle 10*d*, the housing 62 is carried by the upright arms 60 by means of horizontal shafts 62*c* extending from opposite sides of the housing 62 and journalled in suitable apertures 60*e* in the upper portions of the upright arms 60. A portion of each of the horizontal shafts 62*c* extends outside its upright arm 60 and a knob 62*d* is threaded thereon. The knobs 62*d* can be loosened for the purposes of pointing the camera 46 to the center of the circle 10*d* and can be then tightened to hold the camera 46 in the selected orientation. The vertical and orientation adjustments of the camera 46 need be made only once, and depend on the orbital characteristics of a particular satellite from which scan data is received. If the camera 46 is to be moved along the arc of the imaginary sphere which has a circle 10*d* as a cross-section, the spacing of the camera from the center of the imaginary sphere can be adjusted by means of loosening a set screw 46*a* which is threaded into the rectangular frame 64, sliding the camera 46 within the rectangular frame 64 to its proper position with respect to the center of the circle 10*d*, and then tightening the set screw 46*a* to hold the camera 46 in its adjusted position.

A proper tilting angle 37 of the camera lens system 50 is maintained by means of a motor 67 which is either driven by the same signals which drive the motors 52 and 66 or is conventionally driven at a steady speed. In particular, the motor 67 is affixed to the camera 46 by means of a mounting 67*a*, and drives a shaft 67*b* along the length of the shaft. The lens system 50 is suitably supported, as in a view camera, for pivotal movement about the front nodal point 36*a* of the camera lens in the plane of the tilting angle 37, and is pivoted in that plane by means of the longitudinal movement of the shaft 67*b*. The motor 67 is driven at a steady speed resulting in maintaining the tilting angle 37 such that the plane of the camera lens system 50 passing through the rear nodal point 36*b* thereof coincides with the line defined by the intersection of the plane of the film 40 inside the camera 46 and a plane tangent to the curved screen 34 at the central point 44 thereof.

A circular track arrangement of the type shown in FIG. 5 can be used to obtain a polarstereographic map projection of one hemisphere by using only a 180° section of the track 48. Polarstereographic map projection of both hemispheres may be obtained by simultaneously using two such arrangements. In most cases, however, the need is for a polarstereographic map projection of a relatively small portion of the Earth. Then, only a small section of the track 48 shown in FIG. 5 is needed.

If only a small section of the track 48 is used, as for example when generating a map of a small area of the Earth, the distance between the camera lens 50 and the curved screen 34 changes only slightly in the course of the travel of the camera 46 along the track 48. In such cases the automatic focusing and tilting the camera lens may be made unnecessary by choosing a lens with characteristics minimizing the effects of change in the lens-to-object distance. However, if so much of the track 48 is used that the distance between the lens 50 and the curved screen 34 changes substantially, or if it is desirable to use a lens with a larger opening, then provisions must be made for keeping the camera 46 focused at the curved screen 34 and for keeping the positions of the front and rear nodal points of the lens 50 with respect to the circle 10*d* unchanged despite the changing focus of the camera 46. To that end, the camera lens 50 may be a zoom lens synchronized with the travel of the camera 46 along the track 48 to remain focused at the curved screen 34 and to retain the positions of its front and rear nodal points with respect to the circle 10*d*. The lens 50 is controlled by a motor 68 which is either synchronized with the same signals used to index the motor 52, or is driven at a constant speed, so that it can keep the camera 46 focused at the curved screen 34 and can keep the front nodal point of the lens 50 at the circle 10*d* and the rear nodal point of the lens 50 at its original position.

If only one arc 42 (corresponding to only one scan line 18) is shown on the curved screen 34 at any one time, then the curved screen 34 need not be a segment of a sphere, but need be only a segment of a cylinder tangent to the circle 10*d* of FIG. 5 and having its axis in the plane of the circle 10*d*, the radius of the cylinder being equal to the radius of the circle 10*d*. In fact, the curved screen 34 may be of other shapes, so long as it satisfies one requirement: an arc 42 represented thereon must be congruent with an imaginery sphere of which the circle 10*d* in FIG. 5 is a cross-section.

The embodiment described above relies on moving the camera 46 to compensate for the satellite orbital motion, while keeping the curved screen 34 stationary. It should be clear, however, that the goal is to establish relative motion between the film 40 (serving as a map screen) and the curved screen 34 so as to simulate the satellite 14 orbital motion around the Earth 10, and that the goal can be met by moving both the camera 46 and the curved screen 34, or by moving only the curved screen 34 along the track 48. In such relative motion, the relationships of the camera lens 50 and of the curved screen 34 to the imaginary sphere defined by its cross-section 10*d* must be retained.

Similarly, the compensation for the eastwardly rotation of the Earth 10 with respect to the satellite 14 orbital plane, which, in the embodiment described above is carried out by rotating the camera 46 by means of the motor 66, can be carried out by otherwise establishing relative motion between the camera 46 and the curved screen 34, such as by rotating both the camera 46 and the curved screen 34 or by rotating only the curved screen 34. And, the compensation for an angle between the satellite orbital plane and the Earth axis 12 which, in the embodiment described above is carried out by adjusting the orientation of the camera 46 with respect to the plane of the circle 10*d* of FIG. 5, can be carried out by relatively adjusting the orientations of both the camera 46 and the curved screen 34, or by adjusting the orientation of only the curved screen 34, or by adjusting the position of the arcs 42 on the curved screen 34.

I claim:

1. Apparatus for generating polarstereographic projection maps of a spherical body such as the Earth from satellite scan signals comprising:

a. a curved screen coinciding with a portion of an imaginary sphere proportional in size to the scanned spherical body;

b. means for generating on the curved screen representations of the satellite scan signals resulting in a curved screen image representative of an area of the spherical body from which satellite scan signals are derived;

c. a map screen; and d. means for projecting the curved screen image onto the map screen to generate on the map screen polarstereographic map projections of portions of the curved screen image.

2. Apparatus as in claim 1 wherein the curved screen is concave and is the face of a cathode ray tube coinciding with a portion of the imaginary sphere; and wherein the means for generating the curved screen image includes means for converting satellite scan signals transmitted from the satellite into beam control signals for the cathode ray tube.

3. Apparatus as in claim 1 including means for positioning the map screen substantially perpendicularly to an axis of the imaginary sphere corresponding to the pole-to-pole axis of the spherical body.

4. Apparatus as in claim 3 wherein the means for projecting the curved screen image onto the map screen includes lens means having a front nodal point coinciding with a point at which the imaginary sphere axis intersects the imaginary sphere and projecting onto the map screen polarstereographic map projections of portions of the curved screen image.

5. Apparatus as in claim 4 including means for maintaining a tilting angle between the lens means and the curved screen resulting in coincidence between the lens means plane passing through a rear nodal point of the lens means and the line of the intersection of the plane of the map screen and a plane tangent to the imaginary sphere at the center of the curved screen image on the curved screen.

6. Apparatus as in claim 4 including means for compensating for the orbital motion of the satellite around the spherical body comprising means for moving the map screen and the curved screen with respect to each other in synchronism with the satellite motion around the spherical body while retaining the position of the map screen with respect to the imaginary sphere axis.

7. Apparatus as in claim 6 including zoom control means synchronized with the relative motion between the curved screen and the map screen to retain the relative position of the lens means front nodal point with respect to the imaginary sphere during said relative motion, and to retain the relative position of the lens means rear nodal point and the map screen.

8. Apparatus as in claim 6 wherein the compensating means includes at least a portion of a circular track coinciding with a cross-section of the imaginary sphere, and means for moving the map screen along the circular track in synchronism with the satellite rotation round the spherical body while retaining the position of the map screen with respect to the imaginary sphere axis.

9. Apparatus as in claim 4 including means for compensating for rotation of the spherical body with respect to the orbital plane of the satellite.

10. Apparatus as in claim 9 wherein the compensating means includes means for causing relative motion between the map screen and the curved screen, said relative motion having the same effect as rotating the map screen around the axis of the imaginary sphere in synchronism with the rotation of the spherical body with respect to the satellite orbital plane, while retaining the angle between the map screen and the imaginary sphere axis.

11. Apparatus as in claim 10 wherein the map screen comprises a photographic film plate recording permanently the curved screen image.

12. Apparatus as in claim 4 including means for compensating for inclination of the satellite orbital plane with respect to the axis of rotation of the spherical body.

13. Apparatus as in claim 12 wherein the means for compensating for inclination comprises means for changing the angle between the map screen and the curved screen by an amount proportional to the inclination of the satellite orbital plane from the axis of the rotation of the spherical body.

14. Apparatus as in claim 13 wherein the angle which is being changed to compensate for inclination between the satellite orbital plane and the axis of rotation of the spherical body is in a plane which includes, when the map screen and the curved screen are diametrically opposite, the axis of the imaginary sphere corresponding to the axis of rotation of the spherical body and a screen image on the curved screen, said screen image representing a satellite scan.

15. Apparatus as in claim 3 including means for compensating the map screen projection for motion of the satellite around the spherical body.

16. Apparatus as in claim 15 including means for compensating the map screen projection for rotational motion of the spherical body with respect to the orbital plane of the satellite.

17. Apparatus as in claim 16 including means for compensating the map screen projection for inclination between the orbital plane of the satellite and the axis of rotation of the spherical body.

18. Apparatus as in claim 17 wherein the spherical body is the Earth and wherein the satellite is in an orbital plane which is substantially parallel to the North-South axis of the Earth and generates scan signals from radiological measurement of Earth's parameters along scan lines which are directly below the satellite and are substantially perpendicular to the orbital plane of the satellite.

* * * * *